United States Patent
Buttafuoco

(10) Patent No.: US 10,138,821 B1
(45) Date of Patent: Nov. 27, 2018

(54) METHOD OF MAKING A THROTTLE BODY

(71) Applicant: GM Global Technology Operations LLC, Detroit, MI (US)

(72) Inventor: Luca Buttafuoco, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/692,468

(22) Filed: Aug. 31, 2017

(51) Int. Cl.
- *F02D 11/10* (2006.01)
- *F02D 9/10* (2006.01)
- *F02D 9/02* (2006.01)

(52) U.S. Cl.
CPC .......... *F02D 11/106* (2013.01); *F02D 9/107* (2013.01); *F02D 9/1065* (2013.01); *F02D 2009/0255* (2013.01); *F02D 2009/0267* (2013.01); *F02D 2009/0279* (2013.01); *F02D 2011/102* (2013.01)

(58) Field of Classification Search
CPC ........ F02D 11/10; F02D 11/106; F02D 9/107; F02D 9/1065; F02D 2009/0267; F02D 2009/0255; F02D 2009/0279; F02D 2011/102
See application file for complete search history.

(56) References Cited

U.S. PATENT DOCUMENTS

| | | | |
|---|---|---|---|
| 3,550,632 A * | 12/1970 | Kozel | F16K 31/0606 137/625.65 |
| 5,265,572 A | 11/1993 | Kadomukai et al. | |
| 5,492,097 A | 2/1996 | Byram et al. | |
| 6,244,565 B1 | 6/2001 | McDonnell et al. | |
| 6,286,481 B1 | 9/2001 | Bos et al. | |
| 2017/0058789 A1 * | 3/2017 | Murasaka | F02D 9/107 |

* cited by examiner

Primary Examiner — Hieu T Vo
(74) Attorney, Agent, or Firm — Harness, Dickey & Pierce, P.L.C.

(57) ABSTRACT

A method of making a throttle body assembly, includes casting a main body portion having a passage there through and mounting features for pivotally mounting a throttle valve within the passage. An annular spigot is formed by 3-dimensional printing and is welded to the main body portion in order to provide a quicker less expensive method of prototyping.

8 Claims, 3 Drawing Sheets

METHOD OF MAKING A THROTTLE BODY

FIELD

The present disclosure relates to a method of making a throttle body and more particularly to a method of making a throttle body for rapid prototyping.

BACKGROUND

This section provides background information related to the present disclosure which is not necessarily prior art.

A throttle body is commonly used in an air intake system of an internal combustion engine to control the amount of airflow to the engine in response to driver activation of an accelerator pedal. A throttle blade is mounted within the throttle body that regulates the airflow. The accelerator pedal motion can be transmitted via a cable to a linkage that moves the throttle blade. In electronic throttle control systems, an electric motor can be used to control a throttle linkage and is responsive to a throttle pedal position sensor. An engine control unit determines the throttle opening based on accelerator pedal position and inputs from other engine sensors and provides a control signal to the electric motor to control the position of the throttle blade.

The throttle body can generally include an air passage opening for receiving the throttle blade and a shaft for pivotally supporting the throttle blade. The throttle body can also provide a structure for supporting a gearcover with electric connector and an electric motor for actuating the throttle blade. A spigot extends from the air passage opening and provides a connection between the throttle body and an intake manifold or intake runner.

In throttle body design, several variants of spigots can be tested during the development of a new air system. Currently, throttle bodies are made utilizing a specific casting for each design variant. Accordingly, each design variant of a throttle body requires a specific casting. Therefore, each design variant comes at a high cost with a long lead time for each casting preparation. Accordingly, it is desirable to provide an improved method of making a throttle body for prototyping.

SUMMARY

This section provides a general summary of the disclosure, and is not a comprehensive disclosure of its full scope or all of its features.

The present disclosure provides a new process for making a throttle body including a combination of casting and 3-D print. According to the present disclosure, more variants can be produced with a single unique casting to produce throttle bodies quickly and inexpensively. If multiple castings can be avoided, different profiles can be easily and quickly produced by suppliers at lower costs. According to the principles of the present disclosure, the same basic casting can be used with different spigots while each spigot can be 3-D printed from aluminum or other material. Once the first casting is available, a significantly reduced period of time is needed to produce each new 3-D printed spigot variant that can be welded to the cast main body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
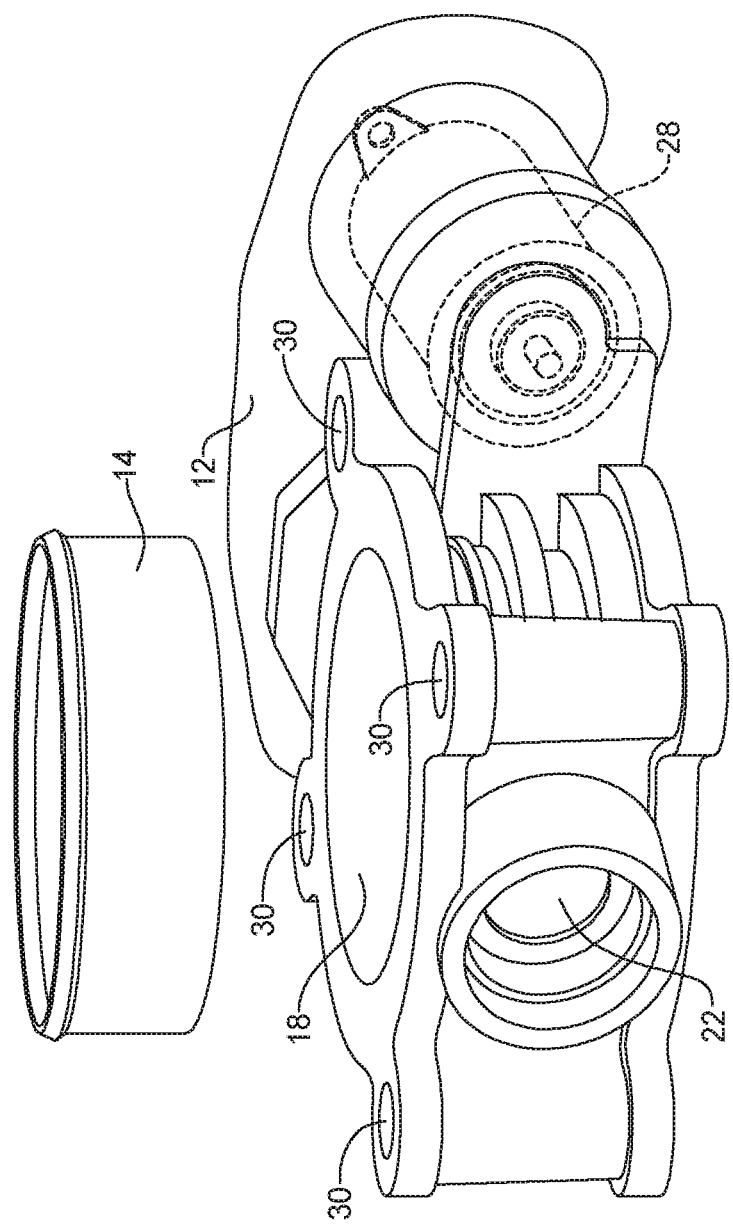
FIG. 1 is an exploded perspective view of an exemplary throttle body according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
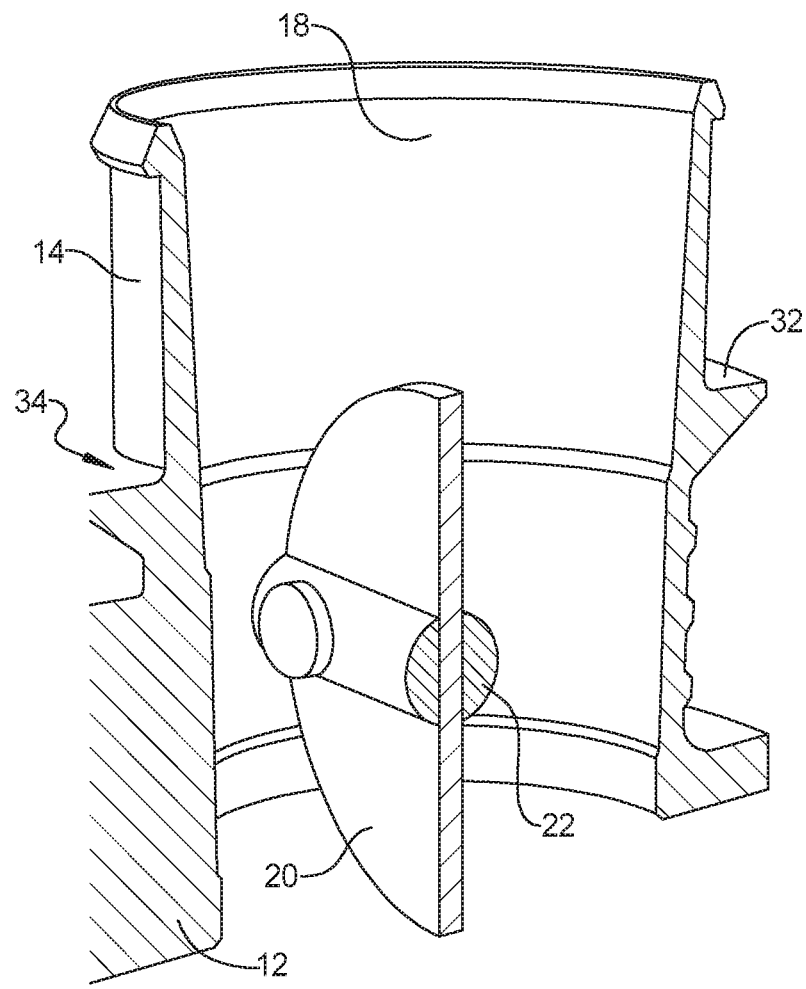
FIG. 2 is a cross-sectional view of the throttle body shown in FIG. 1.
Figure 3:
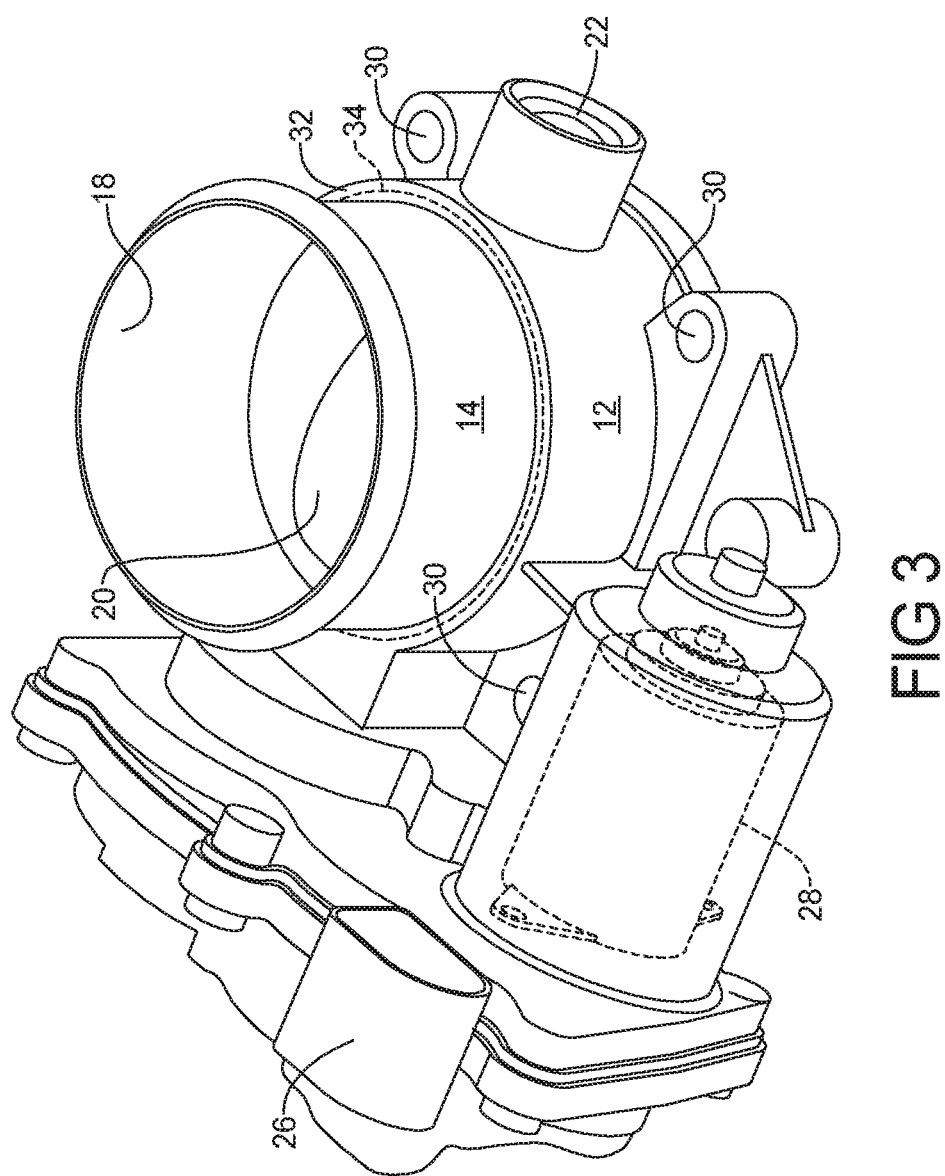
FIG. 3 is a perspective view of an exemplary throttle body according to the principles of the present disclosure.

With reference to FIGS. 1-3, a throttle body assembly 10 according to the principles of present disclosure will now be described. The throttle body assembly 10 includes a main body portion 12 and a spigot portion 14. The main body portion 12 can be formed as a casting from a metallic material such as aluminum. The main body portion 12 can include an air passage opening 18 for receiving a throttle blade 20 and a shaft 22 for pivotally supporting the throttle blade 20. An electric motor 28 for actuating the throttle blade 20 is mounted inside the throttle body portion 12. A gearcover with electric connector 26 (FIG. 3) is mounted on the throttle body portion 12. A gear system or other linkage can be disposed under the gear cover and connected between the electric motor 28 and the shaft 22 for moving the throttle blade 20. The main body portion 12 can include a plurality of mounting holes 30 and an annular seat portion 32 to which the annular spigot portion 14 is welded along weld line 34. The spigot portion 14 extends from the air passage opening 18 and provides a connection between the throttle body assembly 10 and an, air passage, an intake manifold or an intake runner. The spigot portion 14 can be formed utilizing known 3-D printing techniques.

According to the present disclosure, more variants can be produced with a single unique casting to produce throttle bodies quickly and inexpensively. According to the principles of the present disclosure, the same basic casting can be used with different spigots while each spigot can be 3-D printed. Once the first casting is available, a significantly reduced period of time is needed to produce each new 3-D printed spigot variant that can be welded to the cast main body.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a throttle body assembly, comprising:
    casting a main body portion having a passage there through and mounting features for pivotally mounting a throttle valve within the passage;
    forming an annular spigot from a metallic material by 3 dimensional printing; and
    welding the annular spigot to the main body portion.

2. The method according to claim 1, wherein the main body portion includes an annular seat and the annular spigot is welded to the annular seat.

3. The method according to claim 1, wherein the main body portion includes mounting features for a linkage and an electric motor.

4. The method according to claim 1, further comprising mounting an electric motor to the main body portion.

5. The method according to claim 1, further comprising mounting a throttle blade to the mounting features of the throttle valve of the main body portion within the passage.

6. A method of making a throttle body assembly, comprising:
    casting a main body portion having a passage there through and mounting features for pivotally mounting a throttle valve within the passage, the main body portion including an annular seat disposed adjacent to the passage, wherein the main body portion includes mounting features for an electric motor;
    forming an annular spigot from a metallic material by 3 dimensional printing; and
    welding the annular spigot to the annular seat of the main body portion.

7. The method according to claim 6, further comprising mounting an electric motor to the main body portion.

8. The method according to claim 6, further comprising mounting a throttle blade to the mounting features of the throttle valve of the main body portion within the passage.

* * * * *